June 30, 1970  J. D. WELLS  3,517,897
MULTI-MODULE THRUST MOUNT
Filed Sept. 11, 1968
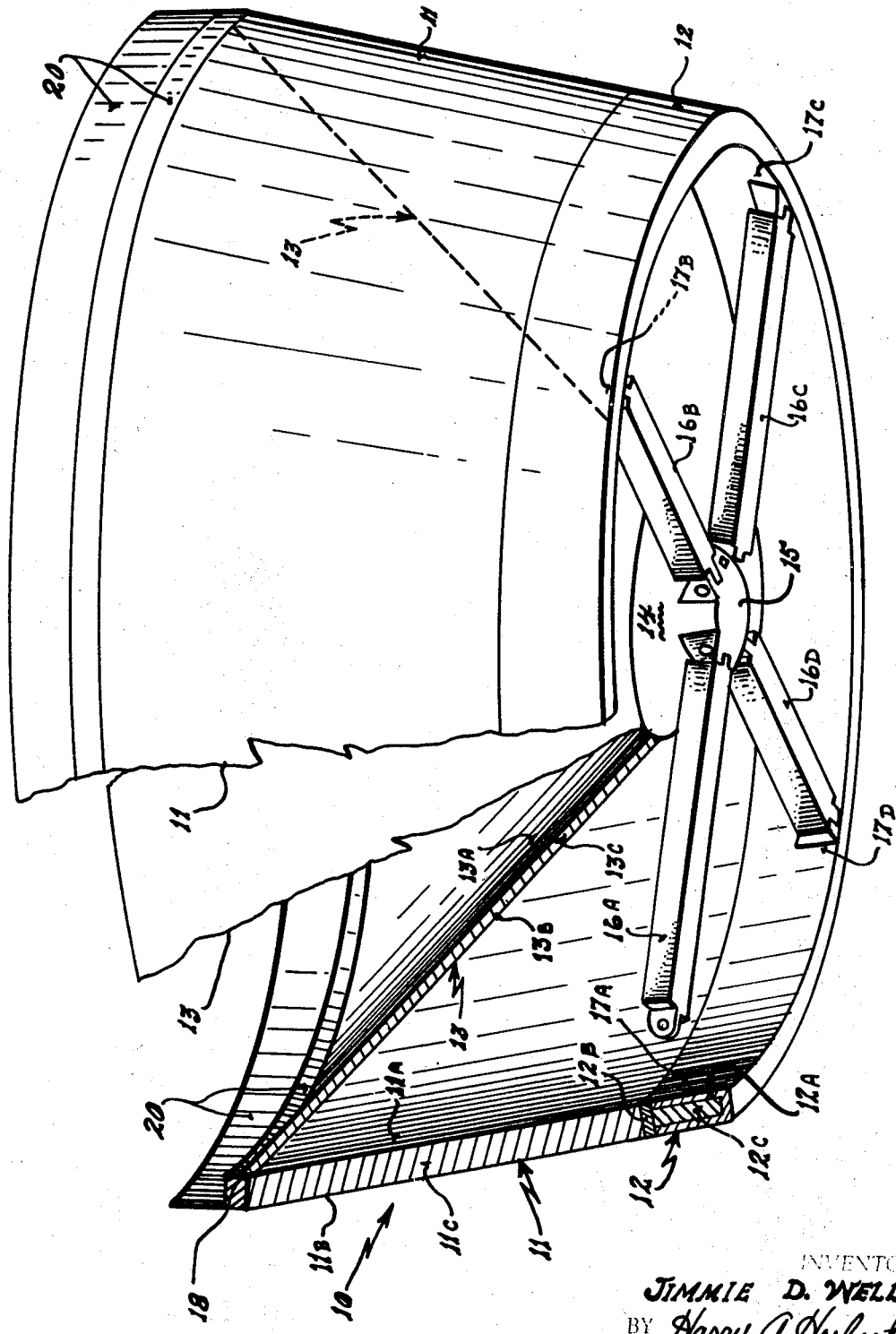
INVENTOR.
JIMMIE D. WELLS
BY Harry A. Herbert Jr.
Arsen Tashjian
ATTORNEYS

3,517,897
MULTI-MODULE THRUST MOUNT
Jimmie D. Wells, Canoga Park, Calif., assignor to the United States of America as represented by the Secretary of the Air Force
Filed Sept. 11, 1968, Ser. No. 758,943
Int. Cl. B64g 1/20
U.S. Cl. 244—1                                                   6 Claims

ABSTRACT OF THE DISCLOSURE

A thrust absorbing mount assembly, for use with space vehicles, which can accept a plurality of propulsion unit modules. The assembly includes: an outer truncated cone of slight taper in an inverted position, having a ring at its bottom periphery; an inner truncated cone of sharp taper in an inverted position, abutting with, internal of, and concentric with the outer truncated cone, and having a central mounting ring at its bottom periphery; and stabilizing struts extending radially from the central mounting ring of the inner truncated cone to equally spaced positions on the inner surface of the ring at the bottom periphery of the outer truncated cone. The inverted, concentric cones are joined along the periphery of their wide openings, at the top where they abut, to a ring by which the trust absorbing mount is attached to the bottom of the space vehicle which is to be propelled.

BACKGROUND OF THE INVENTION

This invention relates to a thrust absorbing mount assembly well suited for use with space vehicles and, more particularly, to a relatively light-weight, high spring rate, thrust absorbing mount assembly which can accept a plurality of propulsion unit modules.

It may be fairly and accurately stated that typical prior art multi-module thrust absorbing mount assemblies suffer from severe shear lag, are relatively heavy, and have a very low spring rate.

A typical prior art multi-module thrust absorbing mount assembly comprises a skin-stringer conical shell with the module thrust loads applied directly to the main longerons. If there is a center mounted module, the thrust is reacted by cross-beams which transfer the load to the main longerons. The total thrust loads must then be transferred to the stringers and distributed around the periphery of the structure by shear lag. However, in order to properly shear lag the loading though the structure to the periphery, the skins must be designed to prevent shear buckling, thereby making them thick. Further, in order to provide adequate nodal action at the stringers, in addition to getting reasonable shear lag distribution, the stringers are made heavier than required to maintain satisfactory stress levels. As a result of the thick skins, and large stringer areas and large longeron areas, the structure is relatively heavy. In addition, because the longerons are supported basically by shear panels, the spring rate of the structure is very low.

The solution to the problem of a relatively heavy weight, low spring thrust absorbing mount is to provide some means for distributing the total thrust load more rapidly around the periphery of the structure.

My invention provides that means and thereby significantly advances the state of the art.

SUMMARY OF THE INVENTION

My invention provides for a light-weight, high spring rate multi-module thrust absorbing mount, particularly well-suited for use with space vehicles.

Therefore, an object of my invention is to reduce the relative weight of such structures.

Another obvious object of my invention is to obtain a relatively high spring rate, i.e., small deflection from the structure.

Still another object is to provide a means for distributing the total thrust load more rapidly around the periphery of the structure.

A further object is to achieve all of the foregoing objects economically.

These, and still other, objects of my invention will become readily apparent after a consideration of the description of my invention and reference to the drawing.

DESCRIPTION OF THE DRAWING

The drawing depicts, in schematic form, a front view, partially fragmented and partially in cross-section, of a preferred embodiment of my invention.

DESCRIPTION OF A PREFERRED EMBODIMENT

With reference to the drawing, wherein is shown a preferred embodiment of my invention for use with five propulsion unit modules, the thrust absorbing mount assembly 10, includes: (a) an outer truncated cone 11 (hereinafter referred to as the "outboard cone") of slight taper in an inverted position, having a ring 12 at its bottom periphery; (b) an inner truncated cone 13 (hereinafter referred to as the "center module thrust cone") of sharp taper in an inverted position, having a central mounting ring 14 with thrust fitting 15 at its bottom periphery, and abutting with, internal of, and concentric with outboard cone 11; (c) stabilizing struts 15A, 15B, 15C and 15D, extending radially from central mounting ring 14 with thrust fitting 15 to equally spaced positions 17A, 17B, 17C and 17D on the inner surface of ring 12; and (d) a ring 20 by which the thrust absorbing mount is attached to the bottom of the space vehicle which is to be propelled.

The inverted, truncated, concentric cones 11 and 13 are joined along the periphery 18 of their wide openings, at the top where they abut, to a ring 20 (hereinafter referred to as a "vehicle attachment ring") by which the thrust absorbing mount assembly 10 is attached to the bottom of the space vehicle (not shown) which is to be propelled.

The cones 11 and 13 are of uniform cross-section at any diametral plane and as a matter of preference, rather than of limitation, are of honeycomb construction, since such type construction provides a lighter weight structure than a conventional sheet-stringer type construction, in that the face sheets 11A, 11B, 13A and 13B of cones 11 and 13 can more fully be utilized as load-carrying members. The honeycomb cones 11C and 13C are stabilized by the nature of the honeycomb composite structure. The face sheets 11A, 11B, 13A and 13B are separated by a sufficient amount of honeycomb cone 11C and 13C to provide stable cross-sections.

Rings 12 and 14 are of box-type construction with a honeycomb core, such as 12C. Ring webs, such as 12A, are shear stress limited and are stabilized against shear buckling by the honeycomb core, such as 12C. Rings caps, such as 12B, are made sufficiently thick to prevent local buckling due to compressive stresses caused by bending.

The stabilizing struts 16A, 16B, 16C and 16D, are of composite construction similar, for example, to the construction of ring 12, and they are sized as beam columns, with the cross-sectional area (not shown) being considerably larger than a simple column, to keep the combined bending and axial stress at a reasonable level.

All metallic portions of thrust absorbing mount members are, preferably, of an aluminum alloy, as are similar portions of members of conventional thrust absorbing mounts.

Propulsion unit modules (not shown) are attached by suitable means directly to ring 12, and, for a single module, or an odd number of modules, the single or odd module is mounted by suitable means to ring 14 at thrust fitting 15.

MODE OF OPERATION OF THE PREFERRED EMBODIMENT

The mode of operation of my invention is better described, and more readily understood and appreciated, if thrust absorbing mount assembly 10 is assumed to have affixed to it an odd number of propulsion unit modules (not shown), with the odd module (not shown) mounted by suitable means to ring 14 at thrust fitting 15 of center module thrust cone 13, and the other propulsion modules (not shown) attached directly to ring 12 of outboard cone 11.

In such a situation, center module thrust cone 13 transmits the thrust from the odd module directly to the vehicle attachment ring 20. Additionally, since cone 13 and outboard cone 11 are connected by stabilizing struts 16A, 16B, 16C and 16D, the radial loading from the other propulsion modules which are attached directly to ring 12 of outboard cone 11 is transferred to cone 13 which transmits the loads, in bending, to vehicle attachment ring 20.

Thus, it can be seen that ring 12 serves to distribute immediately the thrust loading around the periphery of the structure.

Additionally, since cone 13 is used to resist radial loading from the modules (not shown) mounted on ring 12, ring 12 may be made deep and, consequently, light in weight, because of the minimized torsional loading on ring 12.

By using a parametric equation used in the art, the weight of my invention, as compared to a typical prior art thrust absorbing mount assembly, to accept a plurality of propulsion unit modules was calculated and is shown in the following Table 1:

TABLE 1

| Number of modules | Module thrust | Weight (lbs.) prior art | Weight (lbs.) my invention |
|---|---|---|---|
| 4 | 350,000 | 6,830 | 3,410 |
| 5 | 250,000 | 7,090 | 3,067 |
| 6 | 350,000 | 9,130 | 3,390 |
| 8 | 250,000 | 12,220 | 4,179 |

As can be seen, my invention is much lighter in all cases. Of importance for future applications is the fact that the relative weight savings increase significantly with the increase in number of modules. This effect is due to the fact that with the increase in modules the loading is more easily distributed around the periphery of the structure. Therefore, future large boosters could utilize clusters of relatively low thrust modules with my invention, without incurring the conventional large weight penalty. The use of low thrust modules is very attractive, because such modules would be far more economical to develop and to build than a single, high thrust booster.

The deflections of my invention are much lower than those of a typical prior art thrust absorbing mount assembly. Therefore, my invention has a much higher spring rate and gives better stability. The deflections of my invention are compared, for a five-module mount, with the deflections of a typical five-module prior art thrust absorbing mount assembly, in Table 2. It is to be noted in reading Table 2 that the structures are approximately the same size, that they have the same module arrangement, but that the prior art deflections are given for 240,000 lbs. module thrusts, while the deflections for my invention are for 250,000 lbs. module thrusts.

TABLE 2

| | Deflection at— | Deflection, inches |
|---|---|---|
| Prior art | Outboard longeron | 0.94 |
| | Center of cross-beam | 2.59 |
| My invention | Outboard cone | 0.185 |
| | Center cone | 0.125 |

The relative deflections for the center module gives a factor of over 20:1, as compared to the prior art. This allows gimbaling of the center module on my invention; whereas in the prior art the center module had to be fixed.

While there has been described the fundamental novel features of my invention, as applied to the preferred embodiment, it is to be understood that various substitutions and omissions may be made by those skilled in the art, without departing from the spirit of my invention. For example, one could have an assembly with a center module on a center truncated cone, eight modules or an intermediate truncated concentric cone, and twelve modules on a third, still larger diameter, truncated concentric cone. On the other hand, in some cases it may be desirable to have but one truncated cone, i.e. eliminate the center truncated concentric cone shown in the embodiment, and thereby resist side loading in ring 12.

What I claim is:
1. A propulsion unit module thrust absorbing mount assembly, for use with a space vehicle, comprising:
   (a) an outer truncated cone of slight taper, in an inverted position, having a ring at its bottom periphery;
   (b) an inner truncated cone of sharp taper, in an inverted position, abutting with, internal of, and concentric with said outer truncated cone, and having a central mounting ring at its bottom periphery;
   (c) stabilizing struts extending radially from said central mounting ring of said inner truncated cone to equally spaced positions on the inner surface of said ring at the bottom periphery of said outer truncated cone;
   (d) and, means for joining said inverted, truncated, concentric cones at their mating periphery to the space vehicle to be propelled.

2. The apparatus, as set forth in claim 1, wherein said outer truncated cone is of uniform cross-section at any diametral plane and is of honeycomb core construction.

3. The apparatus, as set forth in claim 1, wherein said inner truncated cone is of uniform cross-section at any diametral plan and is of honeycomb core construction.

4. The apparatus, as set forth in claim 1, wherein said ring at the bottom of the periphery of said outer truncated cone is of box-like construction, having ring webs and a ring cap enclosing a core of honeycomb.

5. The apparatus, as set forth in claim 1, wherein said central mounting ring at the bottom periphery of said inner truncated cone is of honeycomb core construction.

6. The apparatus, as set forth in claim 1, wherein said stabilizing struts are sized as beam columns.

References Cited

UNITED STATES PATENTS 3,188,806   6/1965   O'Hara.
3,231,224   1/1966   Koelle.
3,286,629   11/1966  Lane.

MILTON BUCHLER, Primary Examiner

J. L. FORMAN, Assistant Examiner

U.S. Cl. X.R.

60—39.31; 244—54, 74; 248—5